United States Patent
Peng et al.

(10) Patent No.: US 7,668,643 B2
(45) Date of Patent: Feb. 23, 2010

(54) METHOD AND SYSTEM FOR AUTOMATICALLY INSPECTING AND REGISTERING AUTOMOTIVE EXHAUST EMISSION DATA

(75) Inventors: Xinsheng Peng, Wuhan (CN); Xiaoguang Yu, Wuhan (CN); Geen Sui, Wuhan (CN)

(73) Assignee: O2Micro International Ltd., Georgetown (KY)

( * ) Notice: Subject to any disclaimer, the term of this patent is extended or adjusted under 35 U.S.C. 154(b) by 125 days.

(21) Appl. No.: 11/731,067

(22) Filed: Mar. 30, 2007

(65) Prior Publication Data

US 2008/0236141 A1    Oct. 2, 2008

(51) Int. Cl.
G06F 19/00 (2006.01)
G06F 11/00 (2006.01)
G06F 17/40 (2006.01)

(52) U.S. Cl. .................. 701/114; 701/33; 701/115; 702/187; 702/188

(58) Field of Classification Search ............. 701/29–33, 701/101–105, 114, 115, 1, 22, 2; 340/438, 340/439; 123/480, 672, 688; 180/65.2, 65.3; 702/127, 182, 183, 22, 27, 30, 187, 188
See application file for complete search history.

(56) References Cited

U.S. PATENT DOCUMENTS

| | | | | |
|---|---|---|---|---|
| 5,583,765 A | * | 12/1996 | Kleehammer | 701/1 |
| 6,732,031 B1 | * | 5/2004 | Lightner et al. | 701/33 |
| 6,985,787 B2 | * | 1/2006 | Klekotka | 700/121 |
| 7,049,595 B2 | * | 5/2006 | Kansakoski et al. | 250/338.5 |
| 7,290,627 B1 | * | 11/2007 | Gardner | 180/65.1 |
| 7,359,804 B2 | * | 4/2008 | Williams et al. | 702/27 |
| 7,400,398 B2 | * | 7/2008 | Stedman | 356/326 |
| 7,485,861 B2 | * | 2/2009 | Full | 250/338.5 |
| 2003/0130774 A1 | * | 7/2003 | Tripathi et al. | 701/33 |
| 2007/0276561 A1 | * | 11/2007 | Tripathi et al. | 701/30 |
| 2008/0167772 A1 | * | 7/2008 | Du et al. | 701/33 |

FOREIGN PATENT DOCUMENTS

JP         2002197155 A   *   7/2002

* cited by examiner

*Primary Examiner*—Willis R Wolfe, Jr.
(74) *Attorney, Agent, or Firm*—Wang Law Firm, Inc.; Li K. Wang

(57) ABSTRACT

An exhaust emission data processing system for inspecting automatically exhaust emission of the vehicle and wirelessly transmitting exhaust emission inspection data to a remote server is provided. The system includes an exhaust emission processing module, a wireless connection module, and a remote server. The exhaust emission processing module receives OBD data indicating the exhaust emission inspection data from an OBD system embedded in the vehicle via an OBD connector. The exhaust emission processing module creates an exhaust emission inspection package with the vehicle identification and the exhaust emission inspection data. The exhaust emission processing module transmits the package to the remote server for further diagnosis through the wireless connection module. The remote server sends the diagnosis reports back to the vehicle through the wireless connection module.

16 Claims, 5 Drawing Sheets

METHOD AND SYSTEM FOR AUTOMATICALLY INSPECTING AND REGISTERING AUTOMOTIVE EXHAUST EMISSION DATA

FIELD OF THE INVENTION

The invention relates to exhaust emission data processing system and more specifically to automatic inspection and registration of automobile exhaust emission data transmitted wirelessly to a remote server.

BACKGROUND OF THE INVENTION

The Environmental Protection Agency (EPA) requires vehicle manufacturers to install on-board diagnostics (OBD) for emission control on the automobiles. OBD systems (e.g., computer, microcontrollers, and sensors) monitor the vehicle's emission on control systems to detect if the emission exceeds EPA-mandated limits. Such a system, for example, employs an oxygen or nitrogen-sensitive sensor located in the vehicle's exhaust manifold and tailpipe.

The EPA requires that all information monitored or calculated by OBD system to be available through a standardized serial 16-pin connector referred to as the ALDL (Assembly Line Diagnostic Link) or OBD connector. The EPA also mandates that, when emission thresholds are exceeded, diagnostic information collected by OBD systems must be stored in the vehicle's central computer so that it can be used during diagnostics and repair.

A second generation of OBD system, called OBD-II system, monitor emission performance and a wide range of additional data that indicate the performance of the host vehicle. For example, in addition to emission, an OBD-II system monitors vehicle speed, mileage, engine temperature, and intake manifold pressure. The OBD-II system also queries manufacturer-specific data, such as engine-performance tuning parameters, alarm status, and properties related to entertainment systems. In total, OBD-II system typically access hundreds of segments of data related to the performance of the vehicle.

With enhancement of standard for the automobile exhaust emission, more attention is paid to the regular exhaust emission inspection rules and systems. The automobile exhaust emission test center can provide an accurate evaluation of the exhaust emission performance, but the cost for this process is high and also it is not practicable for all the vehicles to drive to the exhaust emission test center to have the exhaust emission evaluation test.

Therefore, it is needed a wireless exhaust emission inspection system that is able to automatically inspect exhaust emission data for the automobile vehicles and wirelessly register the exhaust emission data with a test center for further diagnosis, and it is to such system the present invention is primarily directed.

SUMMARY OF THE INVENTION

The present invention provides a system for automatically inspecting exhaust emission data of a vehicle and wirelessly transmitting the exhaust emission inspection data to a remote server for diagnosis. The system includes an exhaust emission processing module for collecting exhaust emission data of the vehicle and a wireless connection module for establishing a wireless connection channel for said exhaust emission processing module to transmit said exhaust emission data to a test center. The exhaust emission processing module is capable of collecting exhaust emission data from an OBD system embedded in the vehicle. The exhaust emission processing module is capable of providing an identification data of the vehicle, and packing an exhaust emission inspection package with the exhaust emission data and an identification data stored in a first storage included in the processing module. The exhaust emission processing module is capable of transmitting the exhaust emission inspection package to a remote server for diagnosis.

In another embodiment of the invention there is also provided a method for automatically inspecting and wirelessly transmitting emission data of a vehicle. The method includes downloading OBD data from an OBD system embedded in the vehicle, extracting exhaust emission data from the OBD data, creating the information package with the identification data and the exhaust emission data of the vehicle, and transmitting the information packets to a remote server. Moreover, the method further includes generating an evaluation report at the remote server based on the information package and transmitting the evaluation report from the remote server back to the vehicle.

In yet another embodiment of the invention there is also provided a server. The server is capable of processing exhaust emission data package received from a remote vehicle. The remoter server comprises a data management unit. The data management unit comprises a control module for receiving task orders from the remote vehicle and a standard evaluation module for evaluating the exhaust emission data sent from the remote vehicle. The remoter server further comprises storage for storing exhaust emission reports from the data management unit.

BRIEF DESCRIPTION OF THE DRAWINGS

Features and advantages of embodiments of the invention will become apparent as the following Detailed Description proceeds, and upon reference to the Drawings, where like numerals depict like elements, and in which.

DETAILED DESCRIPTION OF THE INVENTION

Figure 1:
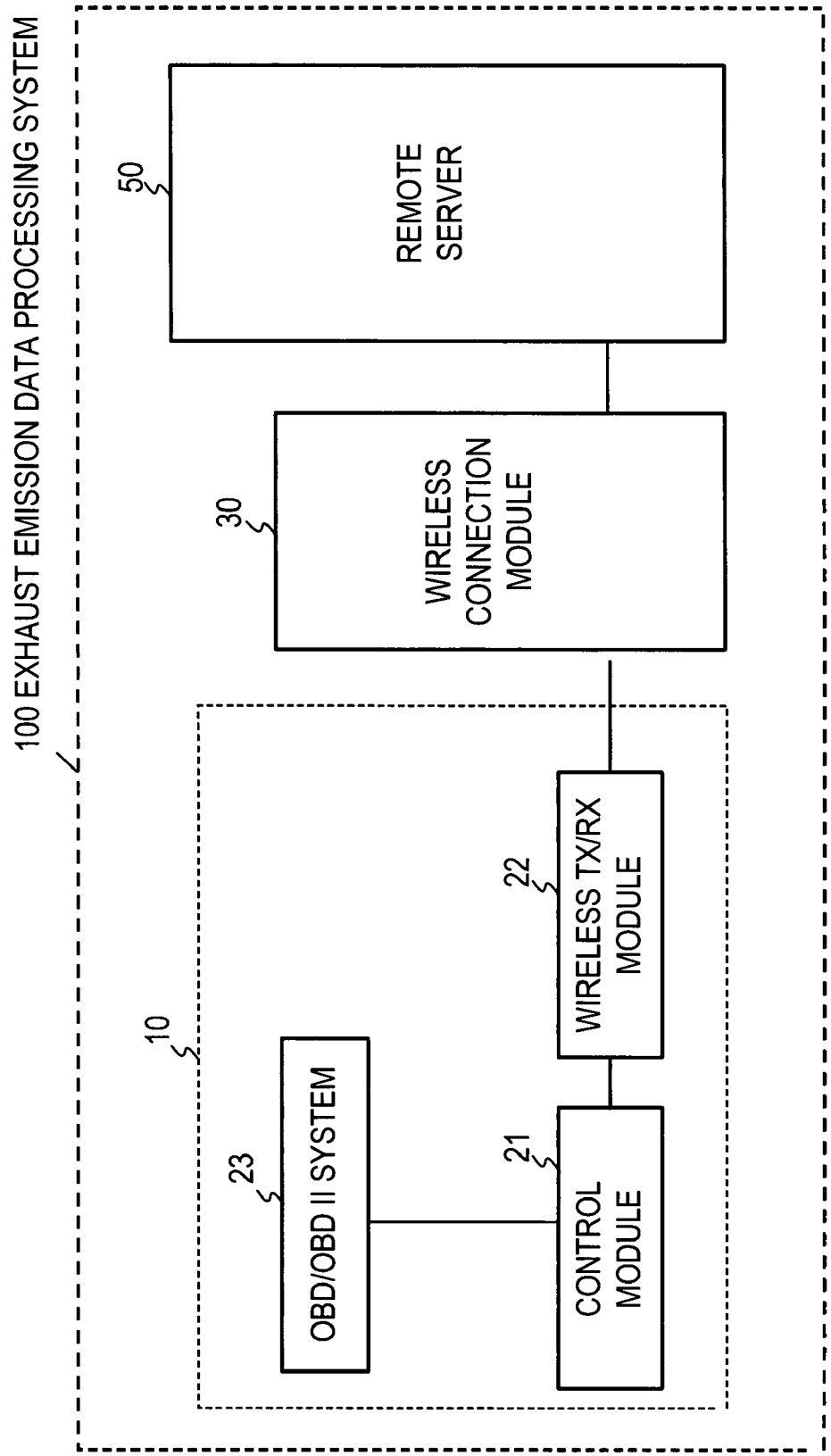
FIG. 1 illustrates an exemplary architecture of an exhaust emission data processing system 100 for automatically inspecting and wirelessly transmitting the exhaust emission data of a vehicle to a remote server.

FIG. 1 illustrates an exemplary architecture of an exhaust emission data processing system 100 for automatically inspecting and wirelessly transmitting the exhaust emission data of a vehicle. The exhaust emission data processing system 100 comprises an exhaust emission data processing module 10, a wireless connection module 30, and a remote server 50.

The exhaust emission data processing module 10 is a system commonly embedded in automobile and comprises a control module 21, a wireless TX/RX module 22, and an OBD system 23. The exhaust emission data processing module 10 provides a unique authenticated identification to automobiles. The exhaust emission data processing module 10 periodically inspects the exhaust emission performance of an automobile automatically and transmits the inspection results to the remote server 50.

The wireless connection module 30 is capable of establishing a wireless connection between the exhaust emission data processing module 10 and a remote server. The wireless connection provides a data exchange channel between the exhaust emission data processing module 10 and the remote server 50. The remote server 50 can be a server located in an exhaust emission test center or a service center.

The remote server 50 receives the authenticated identification information and the exhaust emission inspection data of the vehicle from the wireless connection module 30. The remote server 50 further parses the inspection result, registers the diagnosis result, and transmits the diagnosis result back to the vehicle.

Figure 2:
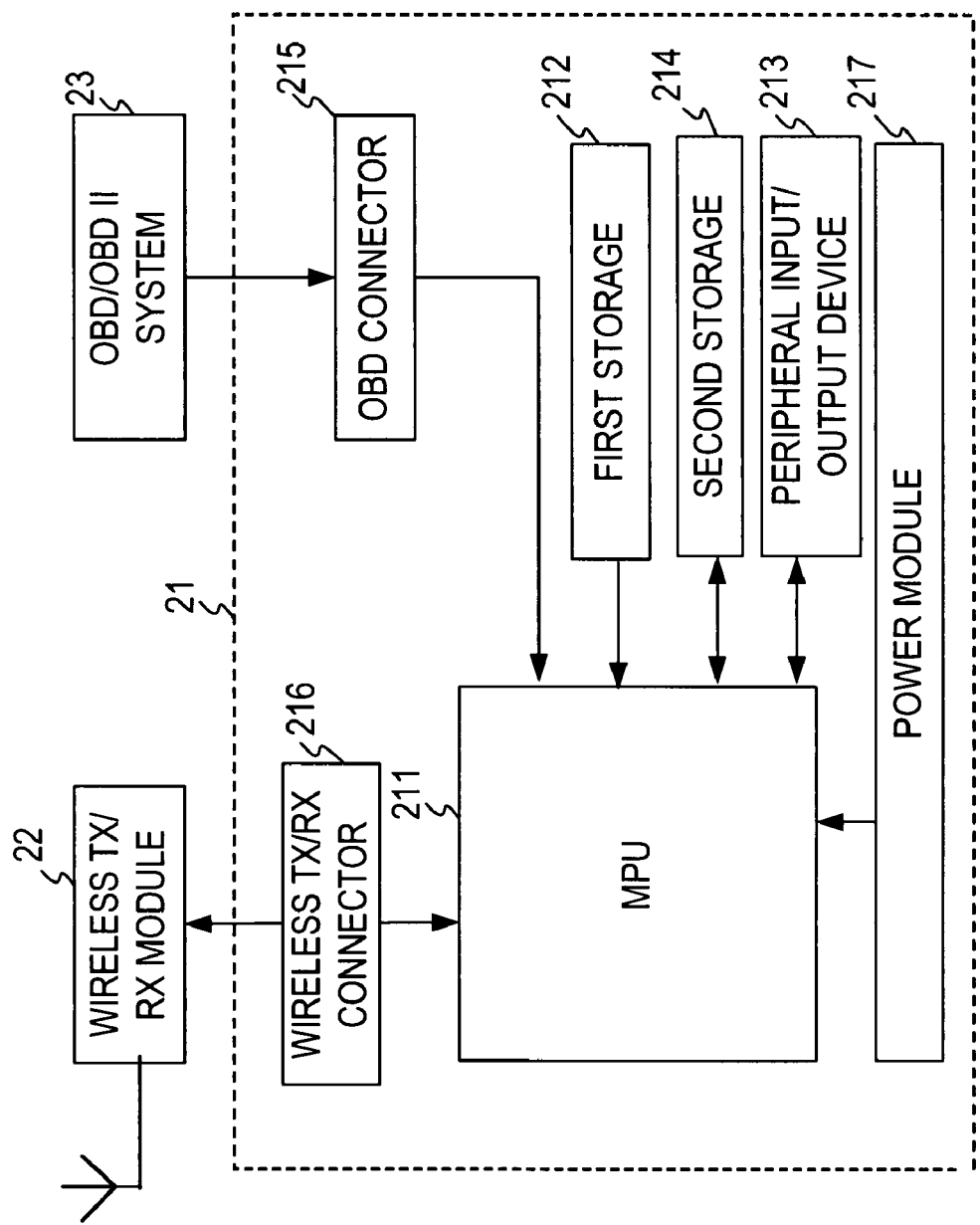
FIG. 2 illustrates a detailed architecture of an exhaust emission data processing module of the process system for automatically inspecting exhaust emission data of a vehicle.

FIG. 2 illustrates a detailed architecture of an exhaust emission data processing module 10 of the processing system 100 in FIG. 1. The exhaust emission data processing module 10 comprises a control module 21, a wireless TX/RX module 22, and an OBD system 23.

The control module 21 comprises a Microprocessor Unit (MPU) 211, a first storage 212 and a second storage 214 which are coupled to the Micro Processor Unit (MPU) 211, a peripheral input/output device 213 (such as keyboard, LCD etc), a wireless TX/RX connector 216, and an OBD connector 215. Optionally, the control module 21 may include a power module 217 that provides power to MPU 211.

The first storage unit 212 is coupled to the MPU 211 for storing a unique identification data which represents the unique identity of the vehicle. The identification data can be a Vehicle Identification Number (VIN), License Plate Number, or some other identification means that uniquely identifies the vehicle. The first storage unit 212 can not be written, erased, or otherwise modified by unauthorized users. It should be noted the first storage unit 212 and the secondary storage unit 214 can be two separate devices, or two different parts of a single device.

The control unit 21 is in communication with the OBD system 23 embedded in the vehicle through the OBD connector 215. The OBD data received from the OBD system 23 is sent to the MPU 211 for further processing via the OBD connector 215.

The MPU 211 packs the exhaust emission data received from the OBD system 23 and the identification data of the vehicle into an inspection package with a predetermined format which can be recognized and processed by a remote server 50. The inspection packet may have several segments including a header, a vehicle ID, a data field and a tail.

More advantageously, with a known position of the vehicle ID included in the packet, the remote server 50 can quickly distinguish various automobiles and process separately according to different diagnosis scales and rules. Consequently, the efficiency of the remote server may be further improved.

After the inspection package is created, the control module 211 transmits the package to the wireless TX/RX module 22 through the wireless TX/RX connector 216. Then, the wireless TX/RX module 22 transmits the package to a network to which the remote server 50 is connected through the wireless connection channel established by the wireless connection module 30.

The wireless connection module 30 establishes a wireless connection channel between the exhaust emission data processing module 10 and the remote server 50 for exchanging inspection package. It is appreciated by those skilled in the art that the wireless transmission protocols used by the system to transmit the data from the vehicle to the remote server may include, but not limited to, GSM, CDMA, TDMA, FDMA, and WLAN protocols.

Figure 3:
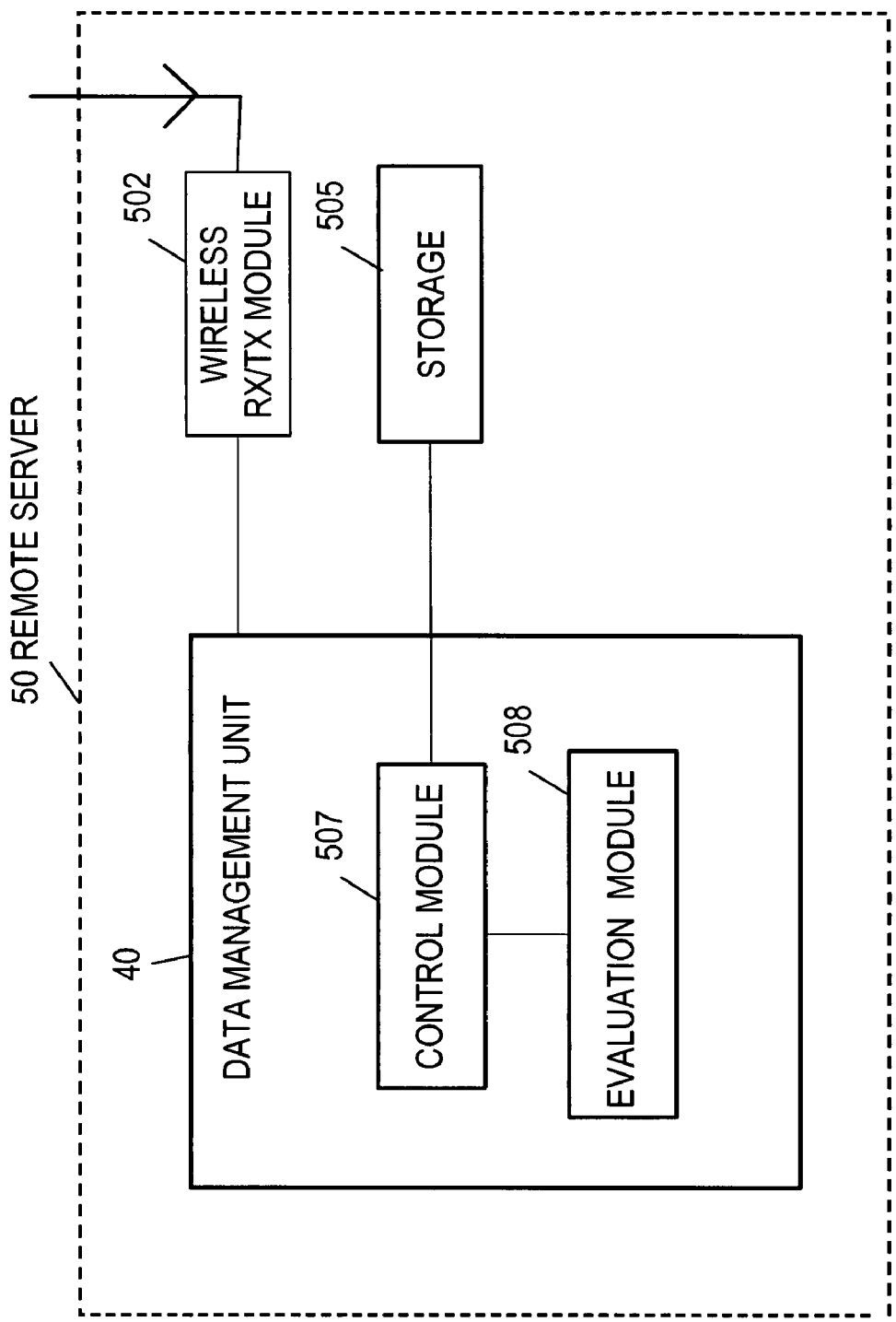
FIG. 3 illustrates a detailed architecture of a remote sever of the processing system for wireless processing exhaust emission data of a vehicle.

FIG. 3 illustrates a detailed architecture of a remote sever 50 of the processing system 100 in FIG. 1. The remote server 50 comprises a data management unit 40. The data management unit 40 can be a computer device with a database. The data management unit 40 comprises a control module 507 for processing task orders from the vehicle and an evaluation module 508 for evaluating the exhaust emission data of the vehicle. The remote server further comprises a storage 505 coupled to the control module for storing exhaust emission reports evaluated by the data management unit 40. The remote server 50 further comprises a wireless RX/TX module 502. The wireless RX/TX module 502 connects with the wireless network to receive exhaust emission inspection package from the vehicle. The wireless RX/TX module 502 connects with the wireless network to transmit the exhaust emission report package generated by the data management unit 40.

The data management unit 40 receives the exhaust emission inspection packet from the wireless connection module 30, extracts the exhaust emission inspection data and identification data from the inspection packets and stores the data in the database for further diagnosis and management.

The data management unit 40 is capable of diagnosing the data according to the identity of the vehicle and generating a diagnosis report of the exhaust emission performance for the vehicle. The data management unit 40 may compare the received exhaust emission inspection data with a preset value, produces an evaluation report indicating whether the emission performance meets a predetermined standard, and then sends the evaluation report back to the exhaust emission data processing module 10. The preset value is set according to different types of vehicles. Then the evaluation reports are sent back to the vehicle through the wireless connection module 30.

The transmission of the data packets to the remote server occurs under many circumstances, including:
(a) when the vehicle receives an inquiry from the remote server;
(b) when the control unit generates a transmission command;
(c) periodically at a configurable predetermined time interval; and
(d) periodically at a configurable predetermined mileage interval.

Figure 4:
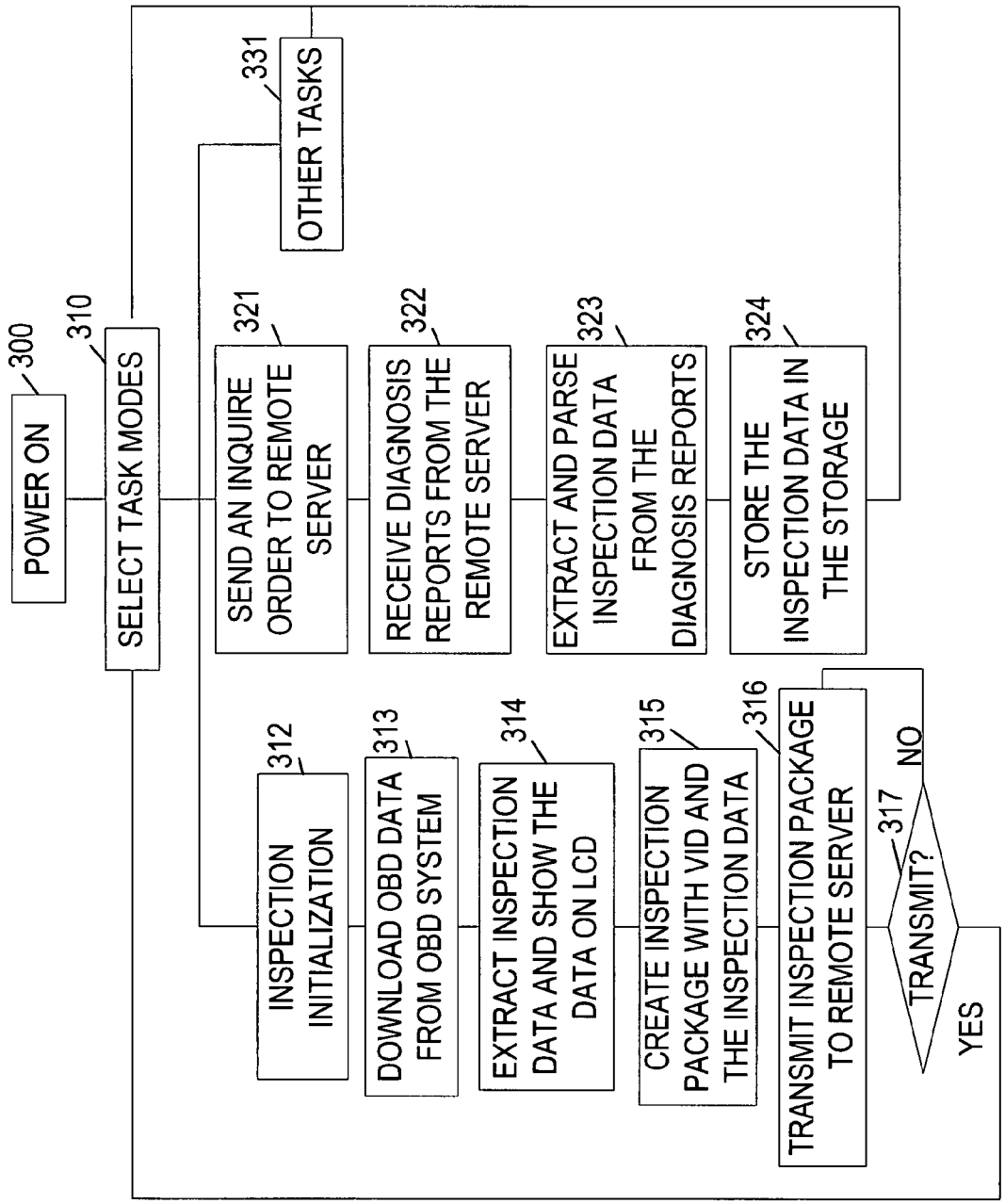
FIG. 4 illustrates an exemplary flow chart of an exhaust emission data processing module 10 processing exhaust emission inspection data.

FIG. 4 illustrates an exemplary flow chart of a process for an exhaust emission data processing module 10. After the exhaust emission data processing module 10 powers on, step 300, the module begins system initialization, step 301. After the initialization is finished, the exhaust emission data processing module 10 enters into selecting task modes, step 310. Tasks include collecting exhaust emission data of the vehicle, inquiring exhaust emission diagnosis result form the remote server 50, and other tasks.

For collecting the exhaust emission inspection data of the vehicle, the exhaust emission data processing module 10 begins exhaust emission inspection initialization, step 312. At step 313, the exhaust emission data processing module 10 downloads the exhaust emission inspection data from the OBD/OBD II system embedded in the vehicle through the OBD connector 215. The exhaust emission data processing module 10 extracts the exhaust emission inspection data from the OBD data and shows the exhaust emission inspection data on LCD, step 314. Then, the exhaust emission data processing module 10 creates the exhaust emission inspection package with the ID of the vehicle (VID) and exhaust emission inspection results, step 315. The exhaust emission inspection package including the VID and the exhaust emission inspection data will be transmitted into the remote server 50 through the wireless connection module 30, step 316. If the transmission is done, the process will go back to selecting task mode, step 317. If the transmission fails, the process will go back to transmit the information package, step 316.

For inquiring exhaust emission diagnosis results form the remote server, the exhaust emission data process module 10 sends an inquire order to the remote server 50, step 321. The exhaust emission data processing module 10 receives the exhaust emission diagnosis reports from the remote server 50, step 322. Meanwhile, the exhaust emission data processing module 10 extracts exhaust emission inspection data from the reports received from the remote server 50 and parses the data, step 323. The exhaust emission data processing module 10 stores the exhaust emission inspection data in the storage and shows the exhaust emission inspection data on the LCD, step 324. Then, the process goes back to selecting task modes, step 310.

Figure 5:
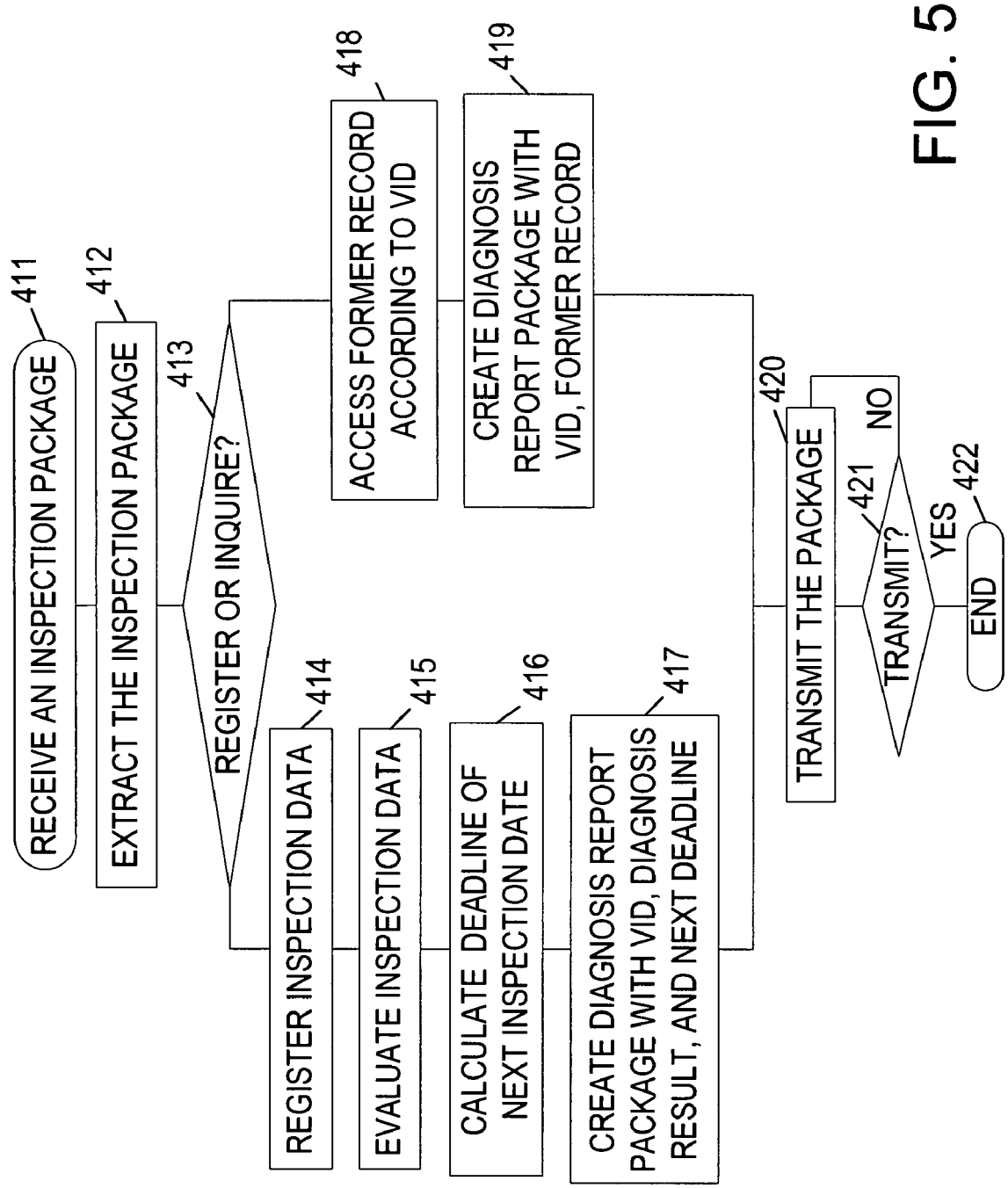
FIG. 5 illustrates an exemplary flow chart of a data management module of the remote server processing exhaust emission data package.

FIG. 5 illustrates an exemplary flow chart of a data management module 40 of the remote server 50 processing exhaust emission data package. The data management unit 40 included in the remote server 50 comprises a standard evaluation module and a control module. The control module receives the exhaust emission data package from the exhaust emission data processing module 10. The standard evaluation module diagnoses the exhaust emission data and creates the diagnosis reports. Then, the control module sends the diagnosis reports to the exhaust emission data processing module 10 through the wireless connection module 30.

In addition, the control module further receives task orders from the exhaust emission data processing module 10, including collecting exhaust emission data of the vehicle, inquiring exhaust emission diagnosis result from the remote server 50, and other tasks. The control module searches the vehicle's data in the database according to the VID included in the data package. The control module accesses the exhaust emission diagnosis reports. Then, the control module sends the diagnosis results back to the exhaust emission data processing module 10.

At step 411, the data management unit 40 receives an exhaust emission inspection package from the exhaust emission data processing module 10. The data management unit 40 extracts the exhaust emission inspection package, step 412. Then, the data management unit 40 determines the task mode according to the task order message included in the exhaust emission inspection package, step 413. The task orders may include registering the exhaust emission data, inquiring the exhaust emission data, and other tasks.

When the exhaust emission data processing module 10 applies for registration of the exhaust emission inspection data, the data management unit 40 receives the exhaust emission inspection package from the exhaust emission data processing module 10 and accesses the exhaust emission inspection data included in the package. Then, the data management unit 40 registers the exhaust emission inspection data according to the VID included in the exhaust emission inspection package, step 414. Meanwhile, the data management unit 40 evaluates the exhaust emission inspection data according to the standard evaluation module stored in the data management unit, step 415. Further, the data management unit 40 calculates the deadline of the next exhaust emission inspection date, step 416. Then, the data management unit 40 creates the diagnosis report package with VID, diagnosis results and the next deadline, step 417, and transmits the diagnosis report package back to the exhaust emission data processing module 10, step 420.

When the exhaust emission data processing module 10 orders to inquire the previous exhaust emission diagnosis reports, the data management unit 40 accesses the exhaust emission record according to the VID included in the exhaust emission inspection package, step 418. Then, the data management unit 40 creates the diagnosis report package with VID, previous exhaust emission diagnosis results and the next inspection deadline, step 419, and transmits the diagnosis reports package back to the exhaust emission data processing module 10, step 420.

It should be noted that the OBD system which is in communication with the emission performance processing system can be a first generation OBD system or a second generation OBD system (OBD-II). Accordingly, the OBD data mentioned here can be generated by a first generation OBD system or a second generation OBD system.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A system for automatically inspecting exhaust emission data of a vehicle and wirelessly transmitting the data to a remote server, comprising:
   an exhaust emission processing module for collecting exhaust emission data of the vehicle, said exhaust emission processing module being capable of providing an identification data of the vehicle, said exhaust emission processing module further being capable of packing said exhaust emission data with said identification data into a data package with a predetermined format; and
   a wireless connection module for establishing a wireless connection channel for said exhaust emission processing module to transmit said exhaust emission data to said remote server.

2. The system of claim 1, wherein said exhaust emission processing module transmits said data package to said remote server through said wireless connection module.

3. The system of claim 1, wherein said exhaust emission processing module further comprising:
   a display system for displaying said emission data of said vehicle and displaying emission diagnosis reports from said remote server.

4. The system of claim 1, wherein said remote server further comprises a data management unit, said data management unit comprises a control module for receiving task orders from said exhaust emission module and a standard evaluation module for evaluating the exhaust emission data sent from the exhaust emission module.

5. The system of claim 1, wherein said exhaust emission processing module comprising:
   an On-Board Diagnostic (OBD) system embedded in the vehicle for inspecting the exhaust emission data for said vehicle;
   a control unit for communication between said OBD system and said remote server; and a wireless TX/RX module for establishing the wireless connection channel between said control unit and said wireless connection module.

6. The system of claim 5, wherein said control unit comprising:
an On-Board Diagnostic (OBD) connector for receiving OBD data from said OBD system;
a Microprocessor Unit (MPU) in communication with said OBD system through said OBD connector, said control unit being capable of extracting automotive exhaust emission data from said OBD data;
a first storage coupled with said control unit for storing identification data of the vehicle;
a second storage coupled with said control unit for storing the exhaust emission data; and
a wireless TX/RX connector for communicating with said wireless TX/RX module.

7. A method for automatically processing and wirelessly transmitting exhaust emission data of a vehicle, comprising the steps of:
downloading OBD data from an OBD system embedded in said vehicle;
extracting exhaust emission data from said OBD data;
obtaining identification data of said vehicle;
packing the exhaust emission data and the identification data into at least one data packet; and
transmitting said data packets to a remote server for diagnosis.

8. The method of claim 7, wherein the step of obtaining identification data of said vehicle further comprising the step of accessing said identification data from a storage unit located within said vehicle.

9. The method of claim 7, further comprising:
receiving a previous diagnosis reports from said remote server when said exhaust emission module sends an inquiry into said remote server;
extracting exhaust emission data from said diagnosis reports; and
displaying said exhaust emission data on a display system located in said vehicle.

10. The method of claim 7, further comprising the steps of:
generating an exhaust emission diagnosis report at said remote server based on said exhaust emission data and said identification data included in said data packets; and
transmitting said diagnosis reports from said remote server to said vehicle.

11. The method of claim 10, further comprising:
displaying said diagnosis reports on a display system located within said vehicle.

12. A server for processing exhaust emission data received from a remote vehicle comprising:
a data management unit for diagnosing exhaust emission data from a vehicle and generating exhaust emission reports;
a control module coupled to said data management for controlling said data management unit; and
at least one storage coupled to said control module for storing the exhaust emission reports,
wherein the server further being capable of calculating a deadline for next exhaust emission inspection date for said vehicle.

13. The server of claim 12, wherein the control unit further being capable of:
registering said exhaust emission data in said storage;
evaluating said exhaust emission data;
generating an exhaust emission report package; and
sending said exhaust emission report package back to said remote vehicle for display.

14. The server of claim 12 further comprises a wireless RX/TX module for receiving an exhaust emission data package from a wireless network and transmitting the exhaust emission report package to the remote vehicle through the wireless network.

15. The server of claim 12, wherein the control module further being capable of processing task orders received from the remote vehicle and an evaluation module for evaluating the exhaust emission data of the remote vehicle.

16. The server of claim 15, wherein said task orders comprise registration and inquire.

* * * * *